(12) United States Patent
Van Den Berg et al.

(10) Patent No.: US 9,313,997 B2
(45) Date of Patent: Apr. 19, 2016

(54) METHOD OF AND AN INSTALLATION FOR MILKING AN ANIMAL

(75) Inventors: Karel Van Den Berg, Bleskensgraaf (NL); Renatus Ignatius Josephus Fransen, Vlaardingen (NL)

(73) Assignee: LELY ENTERPRISES AG, Zug (CH)

( * ) Notice: Subject to any disclaimer, the term of this patent is extended or adjusted under 35 U.S.C. 154(b) by 1089 days.

(21) Appl. No.: 12/142,067

(22) Filed: Jun. 19, 2008

(65) Prior Publication Data
US 2008/0251022 A1    Oct. 16, 2008

Related U.S. Application Data

(63) Continuation-in-part of application No. PCT/EP2006/000630, filed on Dec. 11, 2006.

(30) Foreign Application Priority Data

Dec. 19, 2005    (NL) ...................................... 1030703

(51) Int. Cl.
*A01J 5/00*    (2006.01)
*A01J 5/007*    (2006.01)

(52) U.S. Cl.
CPC ...................... *A01J 5/007* (2013.01)

(58) Field of Classification Search
CPC ........................................................ A01J 5/007
USPC ...................... 119/14.01, 14.08, 14.14, 14.02
See application file for complete search history.

(56) References Cited

U.S. PATENT DOCUMENTS

| | | | |
|---|---|---|---|
| 5,769,023 A * | 6/1998 | van der Lely et al. | 119/14.02 |
| 6,283,065 B1 * | 9/2001 | Shorrock et al. | 119/863 |
| 2003/0019431 A1 * | 1/2003 | van den Berg et al. | 119/14.02 |
| 2003/0150392 A1 * | 8/2003 | Sundborger | 119/71 |

(Continued)

FOREIGN PATENT DOCUMENTS

| | | |
|---|---|---|
| DE | 19502688 C1 | 1/1996 |
| EP | 764403 A1 | 3/1997 |

(Continued)

OTHER PUBLICATIONS

Dairy Farmer May 1986, pp. 44-47, "Back to the Future".

(Continued)

*Primary Examiner* — Joshua Huson
(74) *Attorney, Agent, or Firm* — Hoyng Rokh Monegier LLP; Ramin Amirsehhi; David P. Owen

(57) ABSTRACT

A method of milking an animal comprises determining the identity of the animal and discharging the milk obtained by milking the identified animal to a storage container. The identity of the animal is determined after connecting a teat cup to a teat of the animal or after confining the animal in a milking place and before discharging the milk to the storage container. An installation for milking an animal is provided with a determination device for determining the identity of the animal, a transport arrangement for transporting milk to a storage container for storing the milk and with a control unit for controlling the determination device and the transport arrangements. The control unit is programmed for additionally determining the identity of the animal after connecting a teat cup to a teat of the animal or after confining the animal in a milking place and before discharging the milk to the storage container.

13 Claims, 1 Drawing Sheet

(56) References Cited

U.S. PATENT DOCUMENTS

| | | | |
|---|---|---|---|
| 2003/0172876 A1* | 9/2003 | Ornerfors | 119/14.02 |
| 2004/0103847 A1* | 6/2004 | Larsen | 119/51.02 |
| 2009/0013934 A1* | 1/2009 | Francke et al. | 119/14.02 |

FOREIGN PATENT DOCUMENTS

| | | |
|---|---|---|
| EP | 1131996 A2 | 9/2001 |
| EP | 1374670 A1 | 1/2004 |
| WO | 9526132 A2 | 10/1995 |
| WO | 0018218 A1 | 4/2000 |
| WO | 0022919 A1 | 4/2000 |
| WO | 03059044 A2 | 7/2003 |
| WO | WO 03059044 A2 * | 7/2003 |
| WO | 2004008844 A1 | 1/2004 |
| WO | 2005/039276 A1 | 5/2005 |

OTHER PUBLICATIONS

Guidance on the disposal, treatment and use of milk.. Department for Environment, Food and Rural Afairs, Dec. 2006.

Zacco, Notice of Opposition of EP-B-1 962580 filed Apr. 5, 2012.

Response filed on Nov. 23, 2012 to the Opposition of European Granted patent EP1962580.

* cited by examiner

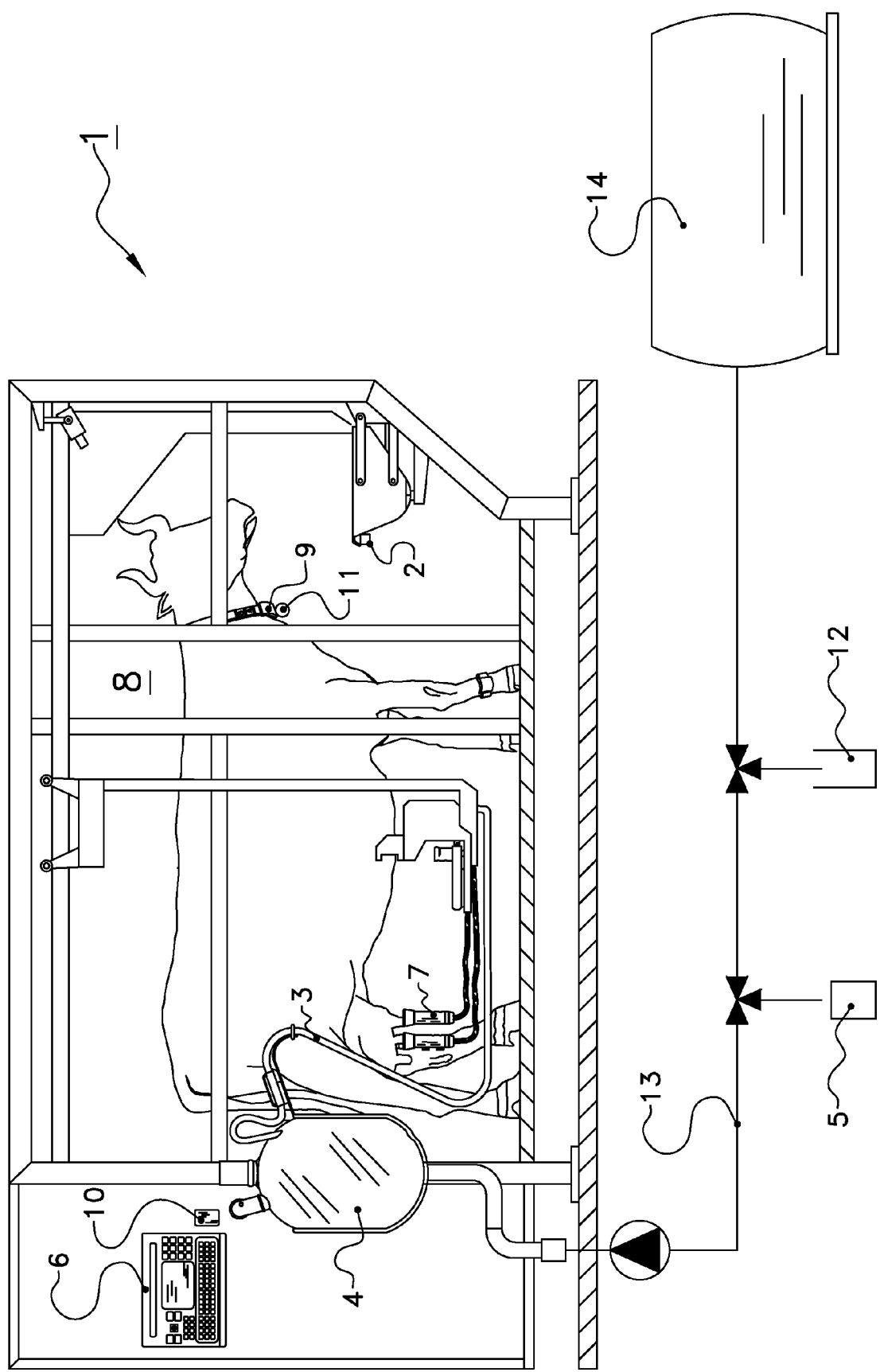

METHOD OF AND AN INSTALLATION FOR MILKING AN ANIMAL

CROSS REFERENCE TO RELATED APPLICATIONS

This application is a continuation-in-part of International Application No. PCT/NL2006/000630 filed on Dec. 11, 2006, which was published under PCT Article 21(2) in English, the contents of which are hereby incorporated by reference in their entirety.

BACKGROUND OF THE INVENTION

1. Field of the Invention

The present invention relates to a method of milking an animal and in particular to a method of identifying the animal being milked. The invention further relates to a milking installation.

2. Description of the Related Art

Methods in which milking of an animal takes place in a milking box are known per se. In such cases, the identity of the animal is normally determined before the animal enters the milking box. The determined identity of the animal is used for allowing the animal to have access to the milking box, for example by opening an entrance gate of the milking box in dependence on the determined identity. Although such a method functions properly, in some cases the milk present in the final storage container appears to be different to that which was expected.

The invention aims inter alia at providing a method of milking an animal, in which the milk present in the final storage container can be better determined.

BRIEF SUMMARY OF THE INVENTION

According to the invention, this object is achieved in that by an additional step of determining the identity of the animal after connecting a teat cup to a teat of the animal or after confining the animal in a milking place and before discharging the milk to the storage container. The invention is based on the insight that in the known method it is possible that, after the identity of an animal has been initially determined, another animal than the animal whose identity has been determined enters the milking box and is milked. In that case, the milk transported eventually to the storage container is obtained from another animal than the animal whose identity has been determined. In particular, if the animal that is allowed to have access to the milking box without having been identified produces milk of a bad or non permitted quality, for example because of a too high cell count or owing to the fact that the animal has been treated with medicines, such as for example antibiotics, the quality of the milk present in the storage container will deteriorate. According to the invention, this problem is solved by determining the identity of the animal that is actually milked after connecting a teat cup or after confining the animal and before the milk is transported to the storage container. If this identity differs from the identity determined for example upon opening of the entrance gate, it is possible, if desired, to take appropriate measures for transporting the milk, for example by ensuring, in the case of milk having a non permitted quality, that the milk will be transported to another storage container than milk with a permitted quality.

In an embodiment of a method according to the invention in which the method comprises the step of providing a first storage container and a second storage container, the method comprises the step of discharging the milk to the first storage container or the second storage container on the basis of the identity determined in the additional step. This makes it possible to transport milk from different animals, possibly differing in quality, either to the first storage container or to the second storage container.

In an embodiment of a method according to the invention, the method comprises determining whether the animal identified is an animal that has been treated with medicines, such as antibiotics, the milk produced by said animal being considered not to be fit for human consumption.

The method comprises advantageously the step of writing information relating to the medicine treatment in a readable memory when an animal is treated with medicines, such as antibiotics. In particular, the information is written in a memory worn by the animal. In a general sense, the method preferably comprises the step of providing an identification mark on the animal when the animal is treated with medicines, such as antibiotics, which identification mark is capable of being detected, and, in dependence on the detected identification mark, the milk is transported to the first storage container or the second storage container. Such an identification mark may be, for example, a separate transponder or responder emitting at a specific frequency.

For the purpose of enhancing the quality of, for example, milk stored in a milk tank, it is advantageous if the method comprises the additional step of reading the memory (or in general detecting the identification mark provided on the animal) after connecting the teat cup and before discharging the milk to the storage container. This makes it possible to ensure that milk from an animal treated with medicines, such as antibiotics, is transported to a separate storage container intended for the purpose. Although this information may be coupled with the identity of the animal, writing this information in a readable memory, in particular a readable memory worn by the animal, may contribute to the reliability of transporting the milk, for example in the case of (temporary) non-functioning of the device for determining the identity of an animal.

Therefore, the invention also relates to a method of milking an animal, the method comprising the steps of determining the identity of the animal; discharging the milk obtained by milking the identified animal to a storage container for storing the milk obtained by milking the identified animal in the storage container; and writing information relating to the medicine treatment in a readable memory when an animal is treated with medicines, such as antibiotics, wherein the method comprises the additional step of reading the memory after connecting a teat cup to a teat of the animal or after confining the animal in a milking place and before discharging the milk to the storage container.

If the method comprises the step of providing a first storage container and a second storage container, it is advantageous if the method comprises the step of discharging the milk to the first storage container or the second storage container on the basis of the information read from the memory.

For the purpose of additional reliability in transporting milk, the method preferably comprises the step of determining the identity of the animal after connecting a teat cup to a teat of the animal or after confining the animal in a milking place.

The invention also relates to an installation for milking an animal, the installation being provided with a determination device for determining the identity of the animal; transport arrangement for transporting milk to a storage container for storing the milk obtained by milking the identified animal, which storage container belongs to the installation; and a control unit for controlling the determination device and the transport arrangement, wherein the control unit is programmed for additionally determining the identity of the animal after connecting a teat cup to a teat of the animal or after confining the animal in a milking place and before discharging the milk to the storage container.

Preferred embodiments of the installation according to the invention are described in the relevant sub-claims.

The invention further relates to an installation for milking an animal, the installation being provided with a determination device for determining the identity of the animal; transport arrangement for transporting milk to a storage container for storing the milk obtained by milking the identified animal, which storage container belongs to the installation; the installation is also arranged for writing information relating to the medicine treatment in a readable memory when an animal is treated with medicines, such as antibiotics, and a control unit for controlling the determination device, the milking device and the transport arrangement, wherein the control unit is programmed for reading the memory after connecting a teat cup to a teat of the animal or after confining the animal in a milking place.

Preferred embodiments of the installation according to the invention are described in the relevant sub-claims.

BRIEF DESCRIPTION OF THE DRAWINGS

The invention will be explained hereinafter in further detail with reference to an embodiment shown in the drawing, in which FIG. 1 is a side view of an installation according to the invention.

DESCRIPTION OF ILLUSTRATIVE EMBODIMENTS

FIG. 1 shows an installation for milking an animal of the type described in co-pending U.S. patent application Ser. No. 11/822,666, the contents of which are hereby incorporated by reference in their entirety. The installation comprises in a manner known per se, for example, a robot arm for automatically connecting a teat cup 7 to a teat of an animal. The installation is provided with a milking place, for example a milking box 8, with an entrance gate and an exit gate, in which the animal can be confined. It is pointed out that the invention is not limited hereto, but that it is also applicable to other milking installations comprising one or more of the following means:

A determination device for determining the identity of the animal. Such a determination device is known per se and may be composed, for example, of a transponder 9 worn by an animal and a reading device 2 for reading the transponder. It is also possible to use image comparing means, an image taken of an animal being compared with an image stored in a memory. Since such determination means are known, they will not be described here in further detail.

A milking device 3,4 for starting the milking, after connecting a teat cup, and further milking the identified animal. Such means are, of course, known per se and will therefore not be described here in further detail.

First transport means for transporting milk to a first storage container 14 (for example a milk tank or a milk container for storing the milk obtained from an animal during one milking), which first storage container belongs to the installation 1, for storing the milk obtained by milking the identified animal. Such transport means comprise milk lines 13 known per se and will therefore not be described here in further detail.

Second transport means for transporting milk to a second storage container 12 for storing the milk stored in an intermediate storage container, which second storage container 12 belongs to the installation 1. In accordance with the present invention, such a second storage container may be formed by a milk tank for unfit milk, but, within the scope of this invention, a discharge means for unfit milk such as a sewer 5, also falls within the meaning of the term second storage container. Such second transport means comprise milk lines 13 known per se and will therefore not be described here in further detail.

A control unit 6 known per se, such as a computer, a microprocessor, or the like, for controlling the determination device 2, the milking device 3, 4 and the transport means 13.

According to the invention, the control unit 6 is programmed for additionally determining the identity of the animal after connecting a teat cup 7 and/or after confining the animal and before discharging the milk to the storage container 14, 12. This makes it possible to determine, during the actual milking, from which animal the obtained milk originates. This information about the identity can then be used for discharging the milk in a correct and reliable manner to a proper storage device.

In many cases known per se, the installation comprises a first storage container 14, for example a milk tank for milk that is fit for human consumption, and a second storage container 12, for example a milk storage container for milk that is unfit for human consumption, or a discharge means to a sewer 5. This makes it possible to discharge milk of a particular quality to the relevant storage container for that milk, in particular if the control unit 6 is programmed for discharging the milk to the first storage container 14 or the second storage container 12 on the basis of the additionally determined identity.

The installation may further comprise means 10 known per se for determining whether the additionally identified animal is an animal that has been treated with medicines, such as antibiotics, the milk produced by said animal being considered not to be fit for human consumption.

According to an aspect of the installation according to the invention, the installation comprises means for writing information relating to the medicine treatment in a readable memory when an animal is treated with medicines, such as antibiotics. Preferably, the readable memory is a memory 11 worn by the animal, the control means being programmed for additionally reading the memory after connecting a teat cup and/or after confining the animal and before discharging the milk stored in the intermediate storage container. Such means for writing information in a readable memory are known per se, but are now used, according to the invention, for writing information relating to the medicine treatment, which information is read during the milking of the animal in question. Said means may be applied, for example, in combination with the means for identifying the animal after starting the milking and before discharging the milk obtained, or separately, for example, for the purpose of being able to determine with certainty, in case of another treatment or at another moment, whether an animal has been treated with medicines. The combination provides a double reliability, on the one hand by means of the determined animal identity and on the other hand by means of the information stored in the memory, so that it will be possible to enhance the quality of the milk, eventually fit for human consumption, in the relevant final storage container. It will be obvious that, in a general sense, one aspect of the invention relates to providing the animal with an identification mark that is detectable by the control unit, which identification mark indicates that the animal has been treated with, for example, antibiotics. Such an identification mark may be a responder emitting at a specific frequency.

Thus, the invention has been described by reference to certain embodiments discussed above. It will be recognized that these embodiments are susceptible to various modifications and alternative forms well known to those of skill in the art.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A method of individually milking an animal, wherein the animal comprises a bovine, the method comprising:
    initially determining the identity of the animal outside of a milking place via a first reading device;
    allowing entry of the animal on basis of initial determination;
    subsequently connecting a teat cup to a teat of the animal;
    milking the animal;
    confirming the identity of the animal with a second reading device inside the milking place after connecting the teat cup; and
    discharging the milk obtained by milking after confirming the identity of the animal.

2. The method as claimed in claim 1, the method comprising providing a first storage container and a second storage container, wherein the method comprises the step of discharging the milk to the first storage container or the second storage container on the basis of the confirmed identity.

3. The method as claimed in claim 1, wherein the method comprises determining whether the animal identified is an animal that has been treated with medicines, the milk produced by said animal being considered unfit for human consumption.

4. The method as claimed in claim 3, wherein the method comprises the step of writing information relating to a medicine treatment in a readable memory in the case that an animal is treated with medicines.

5. The method as claimed in claim 4, wherein the information is written in a memory carried by the animal.

6. The method as claimed in claim 4, wherein the method comprises reading the memory after connecting the teat cup and before discharging the milk to the storage container.

7. The method as claimed in claim 1, wherein the method further comprises confining the animal in a milking place after initially identifying the animal.

8. An installation for individually milking an animal, wherein the animal comprises a bovine, the installation being provided with:
    a first determination device for determining the identity of the animal outside of a milking place;
    a second determination device located inside the milking place for determining the identity of the animal after confining the animal inside the milking place or after connecting a teat cup to a teat of the animal;
    a storage container for storing the milk obtained by milking the identified animal;
    a transport arrangement for transporting milk to the storage container; and
    a control unit for controlling the determination devices and the transport arrangement, wherein the control unit is arranged to confirm the identity of the animal after connecting the teat cup to the teat of the animal or after confining the animal in a milking place and before discharging the milk to the storage container.

9. The installation as claimed in claim 8, the installation comprising a first storage container and a second storage container, wherein the control unit is programmed for discharging the milk to the first storage container or the second storage container on the basis of the additionally determined identity.

10. The installation as claimed in claim 8, wherein the installation comprises an arrangement for determining whether the additionally identified animal is an animal that has been treated with medicines whereby the milk produced by said animal is considered unfit for human consumption.

11. The installation as claimed in claim 8, wherein the installation is arranged for writing information relating to the medicine treatment in a readable memory in the case that an animal is treated with medicines.

12. The installation as claimed in claim 11, wherein the readable memory comprises a memory carried by the animal.

13. The installation as claimed in claim 11, wherein the control unit is programmed for reading the memory after connecting a teat cup to a teat of the animal or after confining the animal in a milking place.

* * * * *